United States Patent [19]

Pizzorno

[11] Patent Number: 4,867,823
[45] Date of Patent: Sep. 19, 1989

[54] METHOD AND APPARATUS FOR THE BUTT-END JOINING OF LENGTHS OF RUBBERIZED FABRIC

[75] Inventor: Augusto Pizzorno, Milan, Italy

[73] Assignee: Pirelli Coordinamento Pneumatici S.p.A., Milan, Italy

[21] Appl. No.: 58,231

[22] Filed: Jun. 4, 1987

[30] Foreign Application Priority Data

Jun. 5, 1986 [IT] Italy .................. 20684 A/86

[51] Int. Cl.[4] .................. B29D 30/00; B65H 69/06
[52] U.S. Cl. .................. 156/157; 156/304.1; 156/304.7; 156/421; 156/502
[58] Field of Search .................. 156/304.1, 304.7, 421, 156/502, 157, 507

[56] References Cited

U.S. PATENT DOCUMENTS

| | | | |
|---|---|---|---|
| 2,088,889 | 8/1937 | Wikle | 156/421 |
| 3,909,341 | 9/1975 | Moscovita | 156/502 |
| 4,057,455 | 11/1977 | Klose | 156/421 |
| 4,231,836 | 11/1980 | Ljungqvist et al. | 156/421 |
| 4,454,000 | 6/1984 | Schlemmer | 156/502 |
| 4,478,672 | 10/1984 | Precht | 156/421 |

*Primary Examiner*—Michael G. Wityshyn
*Attorney, Agent, or Firm*—Birch, Stewart, Kolasch & Birch

[57] ABSTRACT

For the purpose of carrying out the butt-end joining of two lengths of a rubberized fabric, particularly reinforced with cords disposed parallel at the edges to be joined, there is provided a stitching device which comprises two superimposed pairs of frusto-conical rollers, having their lateral surfaces tangent to a horizontal plane, and with opposing pairs of rollers to a vertical plane, their axes of rotation being symmetrically inclined with respect to the tern of planes comprised of a first horizontal plane, or the resting plane for the lengths to be joined, a second vertical plane that contains the seam-line of the lengths, and a third vertical plane, orthogonal to both the two above horizontal and vertical planes.

Owing to the inclination of the axes, the pairs of vertically opposite rollers grasp each border of the length to be joined, on both of the surfaces, in correspondence with a narrow transverse portion of the fabric. Thereupon, they take the narrow portion of the border and press it against the facing border, shifting the narrow portion progressively and with continuity, along the entire length of the same-line.

10 Claims, 5 Drawing Sheets

METHOD AND APPARATUS FOR THE BUTT-END JOINING OF LENGTHS OF RUBBERIZED FABRIC

DESCRIPTION

The present invention concerns a method and an apparatus for obtaining a continuous strip of rubberized fabric, as wide as desired, by successively jointing a series of lengths cut from a band having a constant and pre-fixed width. The definition rubberized fabric, is intended to refer to both a simple sheet of elastomeric material, as well as to the above-said sheet reinforced with materials having oriented short-fibres, or else with textile or metallic cords. For the sake of example, the present description will refer to the formation of strips, provided with transverse reinforcing cords i.e. cords, that are inclined with respect to the longitudinal direction of the strip.

It is commonly known that strips of this type, are obtained from a band of rubberized fabric which is provided with longitudinal reinforcing cords, by cutting pre-determined lengths of fabric from the band and by joining the lengths to one another, in correspondance with the borders which are parallel to the direction of the reinforcing elements.

Strips of this type are, for example, utilized for forming a radial tire carcass, which is formed precisely, by one or more fabric strips with their cords disposed radially, i.e. perpendicular to the circumferential direction of the tire.

For realizing the above strips, two fabric lengths are joined to each other, preferably by the so-called end-to-end system. In other words, two lengths are drawn close together and pressed, one against the other, in correspondence with the border which is parallel to the reinforcing cords.

Due to the effect of this pressure and owing to the stickiness of the raw rubber, the two lengths are bonded to each other, thus originating a single strip. Obviously, a series of successive joints forms a continuous strip of any desired length.

The above joining, involves a very delicate operation and it is of major importance since it conditions both, the successive working phases of the manufacturing cycle, as well as the quality of the finished product.

In fact, a badly made joint could come apart owing to the effect of the longitudinal pull to which the strip is subjected during the steps of the various working processes, so much so that, an operator's manual intervention is rendered necessary for restoring continuity to the strip and hence, the productive cycle is held up, with all the accompanying disadvantageous consequences.

Apart from this, even whent he joint is well made by using the methods and the machines known in the state of the art, there is very frequently experienced an irregular distribution of the cords in correspondence with the seam-line, between the two counter-opposed and adjacent lengths, apart from that which is visible on the finished product only through the means of X-Ray.

Above all, this irregular distribution of the cords arises from the fact that when effecting the joining of the lengths, the machines of the state of the art transfer the elastomeric material from the zone adjacent to the joint to inside the junction zone, with thus causing an accumulation of material between the reciprocally facing cords marking each length end.

Hence, the aim of the present invention is to provide a method and an apparatus that allows for obtaining a rubberized-fabric strip provided, in particular, with transversal reinforcing cords in respect of the longitudinal direction of the strip, while presenting regular, reliable and resistant joints and, in particular, a distribution of the cords, in correspondence with the joint, substantially equal to that of the remaining portion of fabric and which maintains the uniform distribution of the cords, even under the effect of forces applied, when working with the product, such as, for example, during the shaping of the tire carcass.

SUMMARY OF THE INVENTION

Therefore, a first object of the present patent is a method for joining two lengths of rubberized fabric, along two opposite edges, for the purpose of obtaining a continuous strip of rubberized fabric. The method comprises positioning the outgoing edge of a first length of rubberized fabric, parallel and at a pre-determined distance from a seam-line, disposed in a preestablished and invariable position, in the same lying plane as the length along which the joining occurs, positioning the incoming edge of a second length of rubberized fabric coplanar to the first length, symmetrical to the outgoing edge of the first length with respect to the seam-line, blocking each of the edges in the reciprocal positions by means of pressure applied to each edge, in a direction perpendicular to the lying plane of the corresponding length, pressing the edges one against the other, through a longitudinal thrust, acting in the same lying plane of the lengths, in a substantially perpendicular direction to the seam-line, thus realizing the welding between the lengths, characterized in that the blocking and longitudinal thrust are exercised, through each edge, on both surfaces of the corresponding line, upon a limited transversal portion of the rubberized fabric and the joining takes place, through successive points, progressively and simultaneously shifting the limited transversal fabric portions along the development of each edge, or in the same transversal direction.

A second object of the present invention, is in providing a for butt-end joining two rubberized fabric lengths, along their two facing edges, for the purpose of obtaining a continuous strip of rubberized fabric, the device comprising two facing, coplanar and distinct supporting tables, respectively, for a first and for a second length, the intersection of the separating vertical-meridian plane, between the two tables, with the horizontal lying plane of the tables, determining a line disposed in a predetermined and invariable position, along which the joining takes place, with means for gripping the edges of the lengths, symmetrically situated on opposite sides of the seam-line for blocking of the edge each length in the reciprocal positions, by means of pressure acting perpendicularly to the lying plane of the lengths and through forcing each edge against the facing edge, through a thrust acting in the same lying plane, to realize the welding between the lengths, characterized by the fact that:

at least one repeater that is mobile, alternatively in both the senses, along the seam-line, parallel to the lying plane of the lengths, the repeater being provided with two supporting arms, one situated below and the other above the supporting tables;

a first rolling-group fixed to one extremity of the upper arm;

a second rolling-group fixed to one extremity of the lower arm, in correspondence with the first rolling-group;

actioning means for shifting at least one of said rolling groups, in both senses, perpendicular to said supporting tables;

each of the rolling-groups comprising a pair of frusto-conical rollers, situated on opposite sides of a meridian plane, having their axes of rotation lying on the same plane, and inclined with respect to the tern of planes formed by the meridian plane, the lying plane for the tables and by a third plane perpendicular to the above-mentioned two planes, the axes being symmetrically inclined with respect to the meridian plane, the rollers having their lateral surface substantially tangent to the lying plane of the tables;

the rollers corresponding to the first and second rolling-groups, lying on the same side of the meridian plane, being tangent to the lying plane along the same line of tangency.

BRIEF DESCRIPTION OF DRAWINGS

The present invention will be better understood with the aid of the following description and from the attached drawings, made solely by way of non-limiting example, whereby.

DETAILED DESCRIPTION

Figure 1:
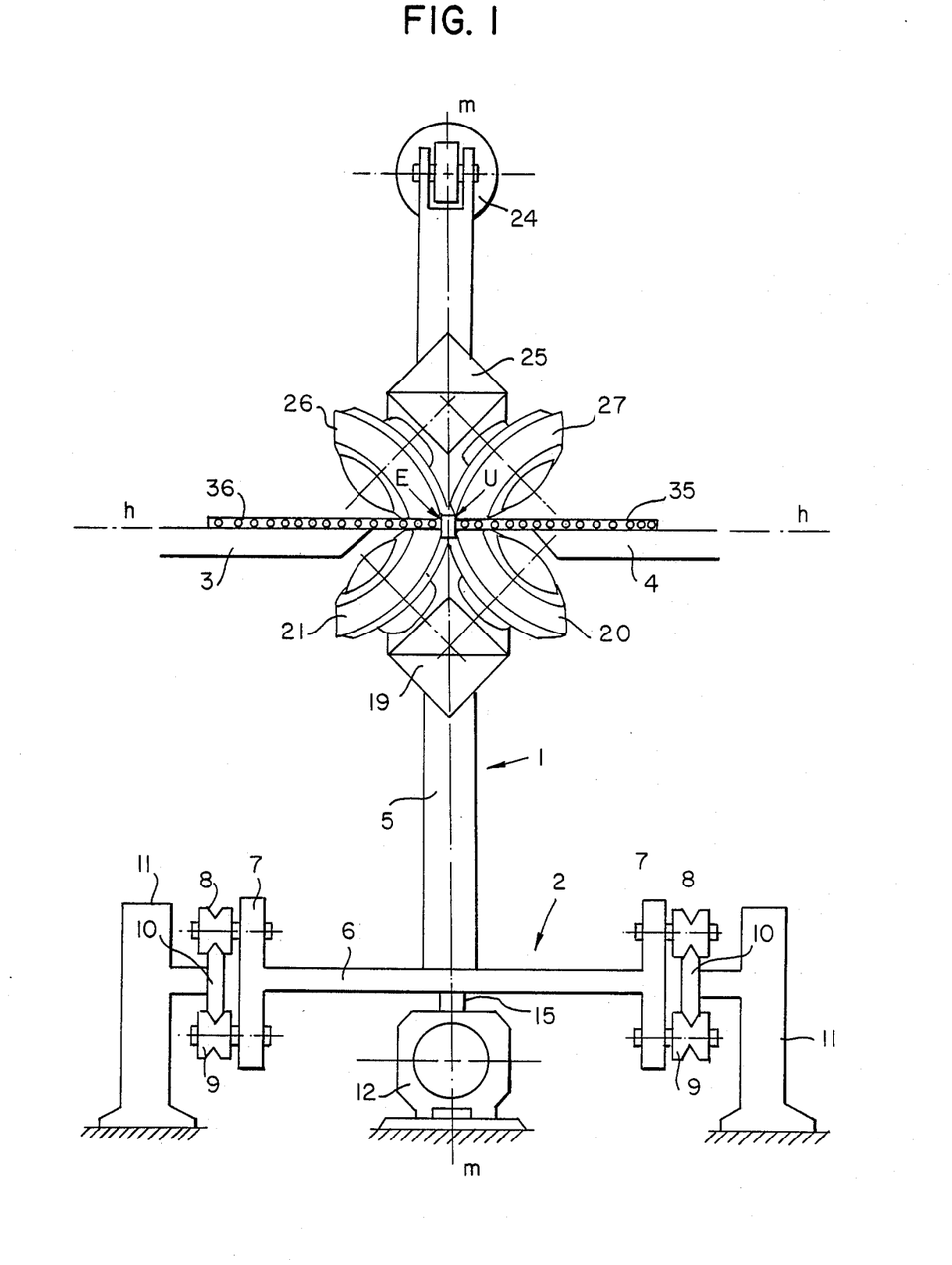
FIG. 1—illustrates a frontal view of the device of the present invention.

FIG. 1 represents a frontal view of the device of the invention, under working conditions i.e. during the joining phase. The present device is comprised substantially of a repeater 1, supported by a carriage that is mobile alternately, in both senses, between the two supporting tables 3 and 4 which are coplanar and side-by-side to each other, and parallel to the line separating the tables i.e. perpendicular to the drawing plane.

The carriage comprises a vertical slab 5, mounted on a double-T shaped horizontal beam 6. At least in correspondence of its two extremities, upon each wing 7, in an axially outer position with respect to the slab 5, the beam is provided with a couple of wheels 8 and 9 presenting a central Vshaped breasthook.

The wheels run along a guide 10 fixed to the base of the machine through suitable supports 11, which present their opposite ends tapered in a V-shape for permitting a kinematic coupling with the couple of wheels.

Figure 2:
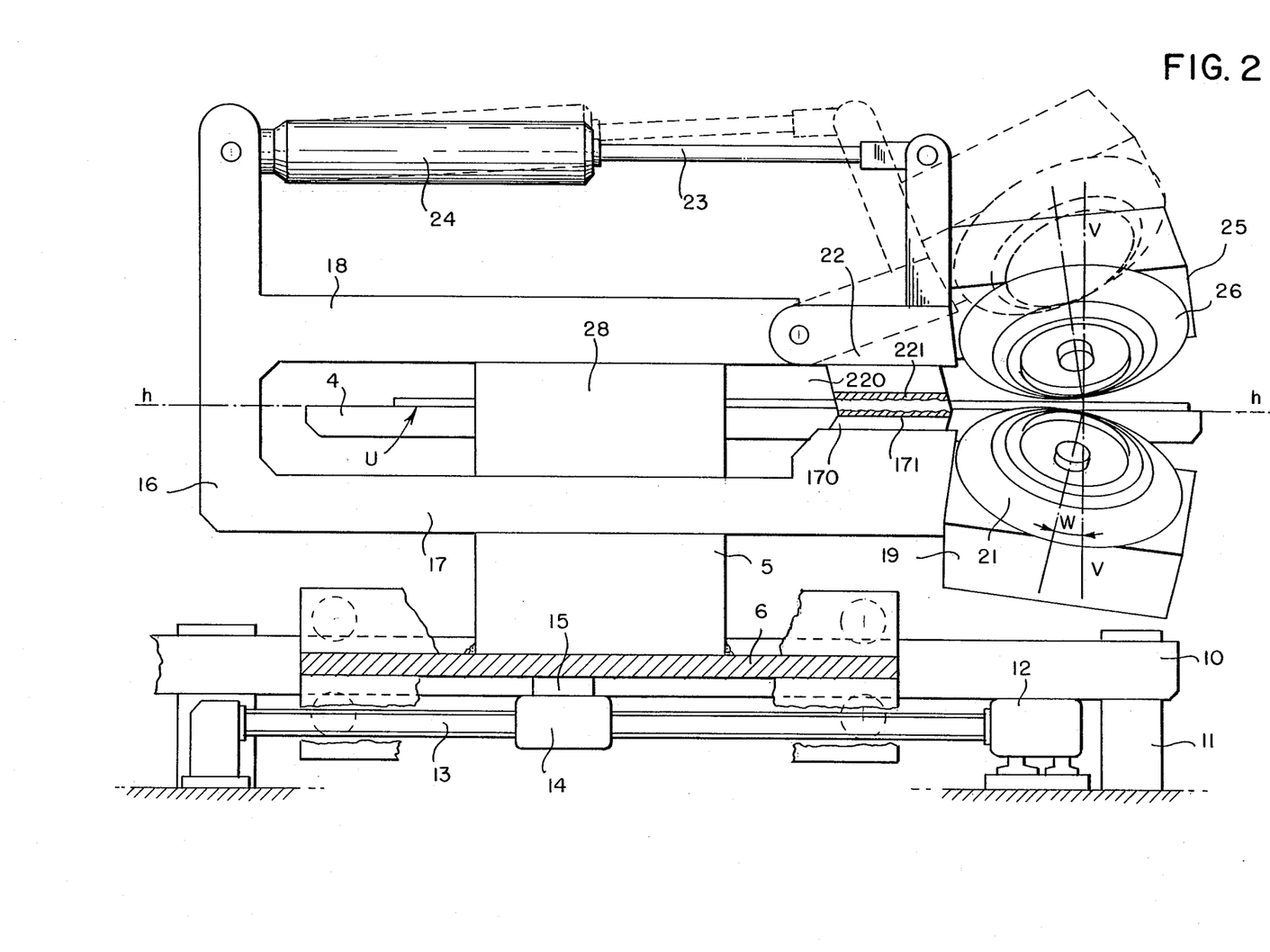
FIG. 2—illustrates a lateral view of the device of FIG. 1.

Moreover, with the aid of FIG. 2 is can be noted further, that the movement of the carriage along the guides 10, is determined by a motor 12 that forces the rotation of an endless screw 13 upon which is coupled a bush 14, fixed in a solid way to the beam 6 by means of a fixing means, such as, for example, a flange 15.

The vertical slab 5 supports a U-shaped frame 16, disposed horizontally in such a way as to present its lower arms 17 and its upper arms 18 disposed respectively below and above the supporting tables for the fabric lengths.

At the ends of the lower arm 17, there is fixed a supporting element 19, a prism for convenience sake, which is connected to the arm, in correspondence with one of the bases.

The orientation of the prism is such that its axis lies in a vertical plane m—m (FIG. 1), inclined with respect to the horizontal lying plane h—h, of the fabric lengths and precisely, from top to bottom, proceeding from the end connected to the U-shaped arm, towards the opposite end.

The intersection of the vertical plane m—m with the horizontal lying plane h—h for the fabric lengths, determines a fixed line, with respect to the apparatus of the invention, along which the translation of the carriage 5 takes place and the joining of the two fabric lengths. For simplicity sake, this joining line is referred to as the 'seam-line'.

In the same vertical plane m—m, there is also found a pair of opposite separating corners, between the lateral adjacent sides of the prism.

Generally speaking, due to the effect of this orientation, the prism presents two faces turned upward, and two faces turned downwards, with all the faces being inclined downwards On each face of the two upper faces, there is mounted a frusto-conical roller (20,21) with its axis perpendicular to the face, disposed with the vertex of the conical surface that lies on the axis of the roller on the side opposite, with respect to the face of the supporting prism.

The dimensions and the disposition of these two rollers 20 and 21 (that will be described in more detail further on in the text), are such that, in correspondence of the resting plane, of the supporting tables 3 and 4, the lateral surface of the rollers is disposed horizontally i.e. tangent to said plane. More precisely speaking, only one generatrix of the surface is disposed horizontally but, in practice, owing to the high value of the flare angle of the conical surface and hence, of the high value of the bending radius of the surface, even a certain portion of surface, on both both sides of the generatrix, is found in a substantiall horizontal position, with acting like the extension of the resting plane of the adjacent supporting table.

The lateral surfaces of the two adjacent rollers (20,21) are very close or even meet in correspondence of the circumference with a greater diameter.

To end with, on the extremity of the arm 17 there can opportunely be mounted a T-shaped flange 170 made fast with the end, with the T-base lying on the meridian plane m—m and the wings 171 lying in a horizontal plane, on opposite sides of the meridian plane. Obviously, when the device is in its working position, the above-said flange does not protrude vertically from the horizontal plane h—h, defined by the surface of the supporting tables 3 and 4, but it is preferably tangent to the plane.

The upper arm 18 of the U-shape is shorter than the corresponding lower arm. To its extremity there is hinge connecting the end of a small square 22 rotating around a horizontal axis, perpendicular to the above-said arm.

The other extremity of the small square is hinge-connected to the rod 23 of a cylinder 24 that, in its turn, is hinge-connected to the U-shaped frame opposite the extremity of the relative arms.

Even these hinge-connections allow for the rotation around the axes disposed horizontally and perpendicularly to the frame.

On the corner of the small square, there is fixed a second supporting element, opportunely a prism 25, substantially identical to that already described, provided with a similar couple of frusto-conical wheels (26, 27) symmetrically disposed with reference to the previous wheels, with respect to the horizontal plane. In fact, the only difference that has any importance with respect to the previously described complex, consists in the orientation of the prism that is now inclined from bottom to top.

On the small square 22 is mounted, solid with the latter, a blade 220 lying on the meridian plane m—m, that protrudes vertically downwards which, when the device is in a working condition, interferes with the horizontal supporting plane h—h for the fabric lengths.

Even the blade 220 can conveniently be provided, on its flanks, with two horizontal wings 221, aligned with the surfaces of the rollers 26 and 27 that are turned towards the horizontal plane h—h, in such a way as to define, along with the corresponding wings 171, an aperture that is substantially equal to the same thickness as the fabric to be joined.

Between them, the U-shaped arms delimit an opening having a width in the direction parallel to the border of the supporting tables, of not less than the length of the border so much so that, when the joining-group is found in correspondence of one extremity of the fabric length, the U-bend i.e. the connecting zone of the two arms, is outside the other extremity of the supporting table.

However, any longer arms would involve constructive, static and dynamic problems in consideration also, of the weight of the rolling-group borne at the extremities of the arms, thus making it preferable to provide the piecing-machine with two repeaters, to be disposed opposite each other and to be coaxially and reciprocally shiftable, in such a manner that each one of them provides with their reciprocal a drawing apart movement, for effecting only a half-joint, from the center line of the strip to one extremity.

In this way, the length of the arms of the U-shaped frame can be reduced by about half while not only providing constructive advantages, but also increasing the productive yield of the apparatus, thanks to the speed with which these joints are executed and the idle strokes of the repeaters.

In fact, when the joint has been effected and each of the two repeaters are each found at an extremity of the fabric length, the group of rollers of each translator is raised (as shown with a broken line in FIG. 2), so that the blade 220 is disposed in a position of non-interference with the underlying fabric. The two repeaters can now be returned to their initial position at the center of the seam-line, simultaneously to the movement of the just-joined fabric length now forming the tail-end of the strip, that traverses the seam-line by passing from table 3 to table 4, until it takes its exiting "U" edge in correspondence with the seam-line, between the groups of rollers, for being ready to be joined to the next fabric length.

It is clear that, in this case, the apparatus should be provided with appropriate sensory devices which are well-known to technicians of the field, for the rigorous positioning, with respect to the seam-line, of the exiting "U" edge at the tail-end of the strip and of the entering "E" edge of the new fabric length to be joined.

Obviously, the productivity of the device is greater than that realized with a similar device, having the same velocity, which nevertheless carries out the joining by starting from one extremity of the fabric length to the opposite end. As a matter of fact, it must first wait for the correct positioning of the exiting-edge "U" of the strip, before returning the repeater to its initial position, at the other end of the sam-line.

For the purpose of explanation and for rendering the invention easier to comprehend, the device has been described as having a lower, fixed group of rollers and an upper, mobile group of rollers, in the vertical plane. In fact, the mobility of at least one of these groups, is essential for causing the device to function.

Hence, it is clear that the device can be realized either with the upper fixed group of rollers and the lower mobile group of rollers or else, with both the groups being of mobile rollers, in the vertical plane.

Figure 3:
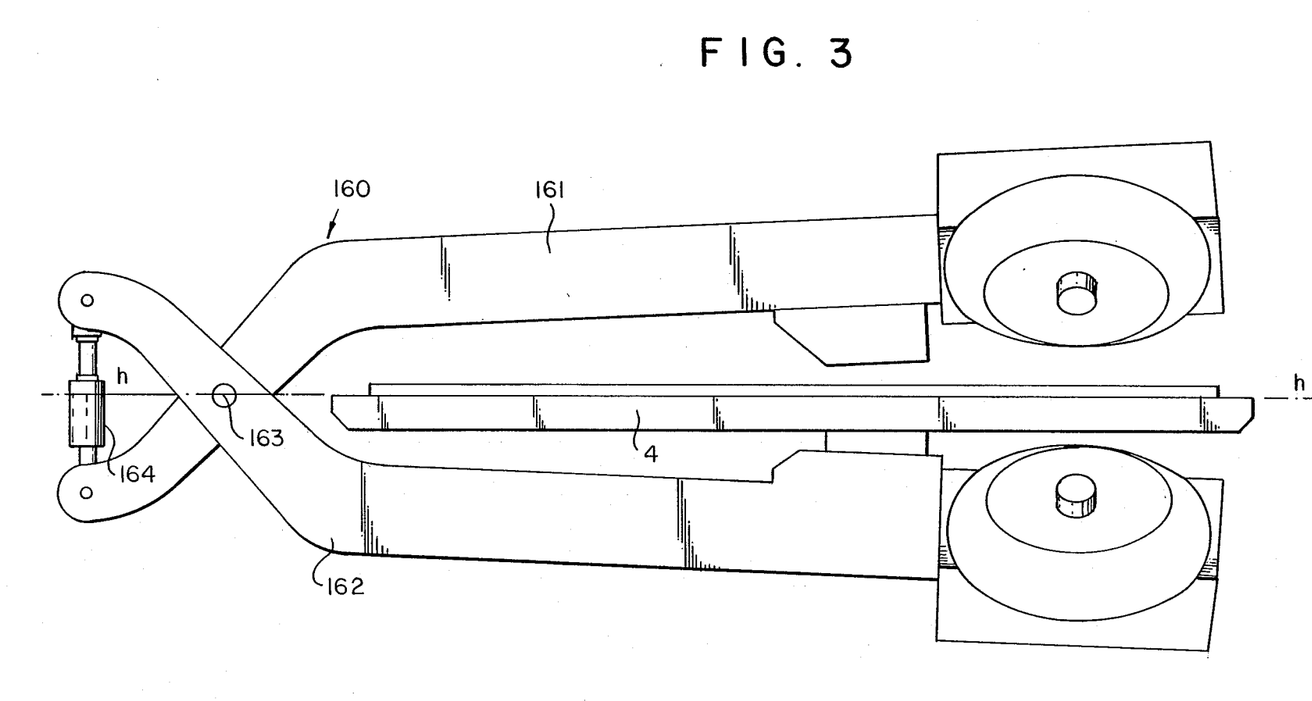
FIG. 3—illustrates the lateral view of the device of the invention, in a second embodiment.

In accordance with this concept, FIG. 3 illustrates a variation in the execution for the device of the invention according to which the frame is now realized with a scissors-type of device (160) wherein the two supporting arms of the groups of rollers form, so to say, the blades of the scissors.

The two arms 161 and 162 are fixed to each other by a hinge 163 having a horizontal axis, with the axis lying on the horizontal plane h—h and with their movement, relative to their opening and closing, being controlled by a cylinder-piston group 164 hinged to the extremities of the arms on the sides opposite the groups of rollers with respect to the above-said hinge.

FIG. 3, schematically illustrates this version ofthe device of the invention since the groups of rollers are identical to those described and moreover, after the explanations given, its application to the device already described and illustrated in FIG. 2 is apparent to one skilled in the art.

Regarding this it must be noted that all of the mechanisms described just explain one of the many possible forms of realization concerning which now the object to be achieved can be realized, and one skilled in the art will have no difficulty in substituting other eqivalent mechanisms.

Even the version illustrated in FIG. 3 foresees the existance, between the two supporting arms 161 and 162, of a completely free aperture, adapted for allowing, when the device is wide apart, the simultaneous movement of the fabric strip and of the repeater, along two incident orthogonal directions lying on the horizontal plane h—h.

Furthermore, it might be preferable to disregard the possibility of this simultaneous movement of the strip and of the repeater, in favor of the other advantages that will be described further on in the text.

According to this solution, the two "U-shaped" arms (FIG. 2), could be connected to each other through a vertical small plate 28 that would have the advantage of stiffening the device and render it more compact, and allow for eliminating the lateral connection between the two supporting arms, the reduction of their total length and above all, the lessening of the length of the cantilevered part with respect to the previously illustrated version.

It can immediately be noted that in this case, during the movement of the carriage, the small slab moves alternately, in both the senses, between the two side-byside supporting tables and consequently, between the facing edges of the two fabric lengths that must be welded end-to-end, making it impossible to carry out the return stroke of the repeater simultaneously to the winding of the strip. But one has to first wait, for the exitingedge of the tail-end of the strip to go past the seam-line, therefore, leaving free the space comprised between the two supporting tables 3 and 4.

Compared to this disadvantage however, the solution illustrated attains another advantage offered by the possibility of eliminating the above-said sensory devices, necessary for the correct positioning of the entering-edges of the fabric lengths that must be joined, and for the exiting of the tailend of the strip.

In fact, the correct positioning can be obtained by simply sending against the abutting small plate 28 surface, from opposite sides, the two portions of fabric to be joined i.e. the new length that has arrived and the tail-end of the strip under formation which, in said case, are found automatically aligned parallel to each other and at a precise, pre-fixed distance apart.

Figure 4:
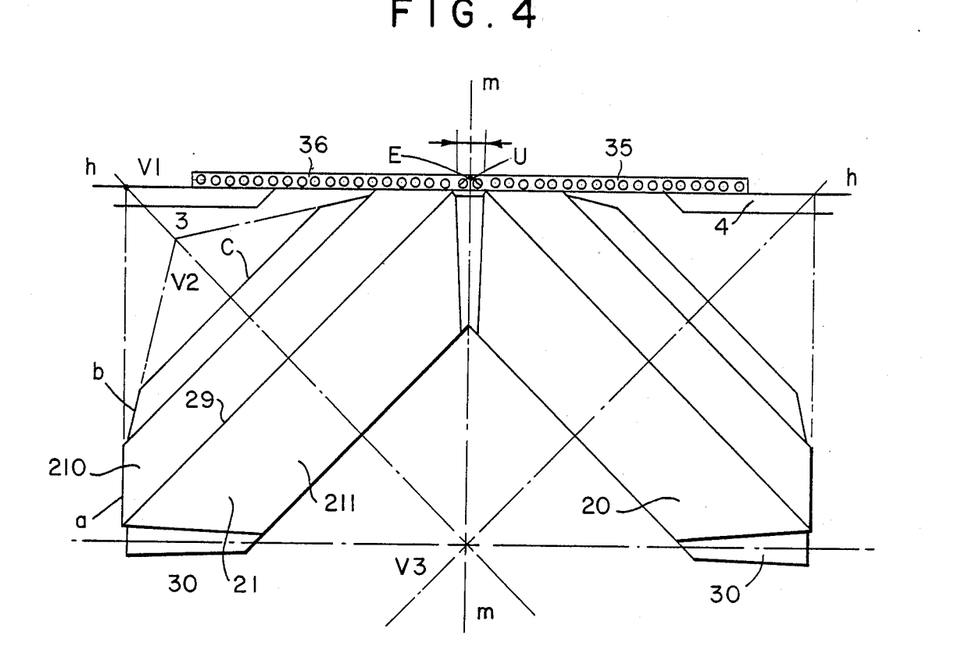
FIG. 4—illustrates the rolling elements of the device of the invention, in a first embodiment.
Figure 5:
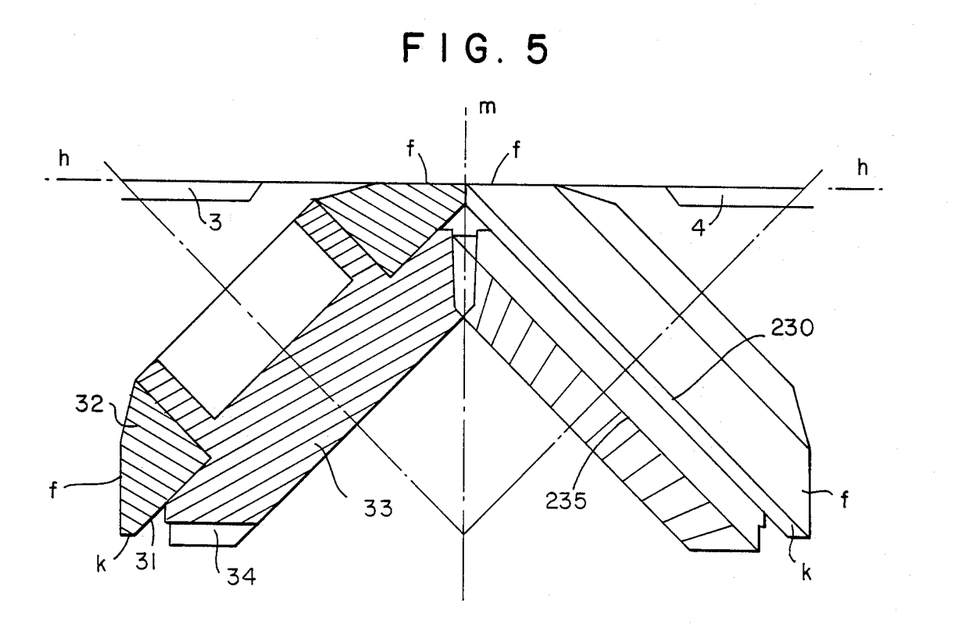
FIG. 5—illustrates the rolling elements in a second embodiment.

Coming now to the frusto-conical rollers that form the essential part of the invention, FIGS. 4 and 5 illustrate respectively two diverse variations of realization of the couple of rollers 20, 21, in the rolling-group in a lower position to the table for supporting the lengths. Obviously, the rollers 26, 27, that are mounted on the upper rolling-group, will be quite identical to those of the lower group, however, they have not been shown in detail in the figure, solely for the purpose of allowing for a greater simplicity in the description and for facilitating the interpretation of the drawings.

Before proceeding with the description, it is necessary to clarify that the angular values that will be cited further on, are owed to the fact that the axes of rotation of the two couples of rollers, that are mounted on the same prism, lie on the same plane, inclined reciprocally at 90°. This orientation allows for realizing in the simplest and most economical manner, the necessary synchronism of the rotation between the two rollers and hence, apart from it being a preferred solution, this has been also considered an element of reference for the present description. It is obvious that, when varying this reciprocal inclination, all the associated angular values must also change. Furthermore, a technician of the field will have no difficulty in finding the corresponding new angular values. It has already been said regarding these rollers, that they substantially present the lateral frusto-conical surface tangent to the horizontal plane and with the vertex on the axis of the roller on the side opposite, with respect to the face of the supporting prism.

In reality, according to a preferred form of realization, these rollers have a very complex structure originated by the coupling of the two frusto-conical bodies (210,211) in correspondence of the greater bases. The roller (21) therefore presents a circumference (29), that has a maximum diameter, which divides into two facing portions the lateral surface of the roller. We shall call these two opposed portions, respectively, the axially interior (211) for the surface facing the supporting prism and the axially exterior (210) for the surface in an axially opposite position.

The axially exterior surface, corresponding with the working surface of the roller, is a conical surface "a" with its vertex V1 lying on the axis of the roller and with the flare angle equal to 90° or preferably, slightly over, that developes from said circumferential line with a maximum diameter.

Owing to the effect of the inclination, a generatrix of the above-said frusto-conical surface, will result tangent to the lower surface of the length 36 of fabric predisposed for the jointing, or preferably, incident on the said surface, towards the entering edge E of the fabric length.

For the purpose of limiting the width of the surface portion of the fabric involved by the respective roller, the working surface "a" is fixed to the lesser base "c" of the frusto-conical body, through a second frusto-conical surface "b" having a flare angle that is substantially greater than 90° and hence, vertex V2 lying on the axis of the roller, in an intermediate position between V1 and the lesser base of the roller.

Even the axially interior surface of the roller is frusto-conical with the vertex V3 on the axis of the roller, disposed on the same side as the supporting prism.

The flare angle of the surface will be about 90° in such a way as to realize a corner, also of about 90°, in correspondence of the circumference that has a maximum diameter.

For the purpose of the joint to be effected between the two lengths of fabric, the axially interior surface does not undergo any direct intervention and hence, the axially interior frusto-conical body can also be omitted. Nevertheless, as has already been mentioned and as will be seen better further on, it is appropriate for the rollers to rotate synchronously to one another. For obtaining this synchrony, quite conveniently the said axially interior surface, of the roller of the invention, is provided with a plurality of teeth 30 disposed according to the generatrices of the said frusto-conical surface, which mesh with a corresponding toothed crown made on the adjacent roller.

It is always appropriate, but at times even essential, for the front surface of said toothed crowns not to coincide with the working surface "a" of the roller. In fact, subsequent to the pressure exercised by the rolling group on the fabric to be jointed, the working surface of the rollers partially penetrates into the fabric, especially when the generatrix of the surface, as already said, is not parallel, but rather incident on the surface of the fabric length. In this case, the reciprocal coupling of the two toothed crowns, can negatively influence the quality of the joint, since the relative teeth would sink too deeply into the surface of the fabric, with causing of a part of the elastomeric material to be shifted from one side of the seam-line to the other i.e. of the meridian plane m—m, with accumulating said material in the junction zone.

This is precisely one of the negative aspects of the 'known' processes and devices, for which instead, the present invention provides a remedy.

In other words, the front surface of the teeth must be made lower with respect to the surface "a", enough for not permitting the tooth to sink into the elastomer material of the fabric and hence, with the consequent shifting of the material into the junction zone.

The value given to the lowering of the teeth, therefore, depends mainly upon the type of fabric concerned in particular, upon the characteristics of the elastomeric material, as well as upon the pressure exercised on the fabric by the couples of opposed rollers disposed in the vertical plane.

To end with, the Applicant has found it convenient to let there be, between the surface "a" of the roller and the front surface of the relative toothed crown, a step having a height comprised within the range of between 0.5 and 1 mm.

It is obvious that, in this instance, the working surfaces "a", of the two adjacent rollers, will be spaced apart by the width "i" of the tooth.

For the purpose of eliminating this spacing that imposes the reciprocal contact between the working surfaces of the two adjacent rollers, the axially interior frusto-conical surface, presents an undercut 31 (according to an appropriate variation of embodiment for said rollers shown in FIG. 5), having such a width as to allow for housing the toothed crown of the roller.

The above-said roller, can be conveniently realized, for example by a substantially frusto-conical bush 32 presenting two frusto-conical surfaces (f, k) turned up on opposite sides with respect to the axis of the bush, and connected to one another along the circumference 290 having a maximum diameter, with each surface having a flare angle equal to 90°, screwed down on a frusto-conical pivot 33 presenting, in an axially interior position, a frusto-conical toothing 34 whose maximum diameter 295 is less than the maximum diameter of the bush.

In this way, the two rollers can be coupled to one another, with a reciprocal meshing of the two toothed crowns, while obtaining the synchronism of the rotation movement and simultaneously, the reciprocal approaching to side-by-side of the two working surfaces "f" in correspondence of the corner which identifies the circumference 290 having a maximum diameter.

In other words, the axial distance between the two facing surfaces "k" (FIG. 5), becomes independent from the dimensions of the toothed crown and can be reduced to next-to-nothing by bringing the two surfaces into reciprocal contact.

The just described rollers are mounted in pairs upon the two supporting prisms, as previously stated, and as illustrated in the figures of the herewith attached drawing sheets.

It has already been said that the axes of rotation of the two rollers mounted on the same support, lie in the same plane. Moreover, with keeping in mind that the supporting prism is inclined with respect to the horizontal plane, it can be understood how, in the end, the axis of each roller results as being inclined with respect to the tern of planes constituted by the horizontal plane h—h, the meridian plane m—m (FIG. 1) and by a third plane v—v (FIG. 2) that is perpendicular to both the plane h—h and the plane m—m.

Of the three angles cited, the angle w between the plane containing the axes of the two adjacent rollers and the plane v—v, is the angle that directly influences the jointing operation.

In fact, the value of the angle w determines the inclination of the generatrix "g" of the frusto-conical surface "a" that results as being tangent to the horizontal plane (FIG. 6), with respect to the perpendicular direction of the seam-line.

For w=0, it is obvious that the generatrix "g" is perpendicular to the seam-line.

The choice of the values given to the angle w depends mainly upon the type of fabric concerned and upon the pressure desired for the jointing. In any case, according to the invention, the value of w should not exceed 25° and, for preference, it should be comprised between 5° and 15°.

Further, for the symmetry of the reciprocal inclination between the axes of the four rollers, with respect to the three planes indicated, the generatrix "g" of the vertically opposite rollers, are contained in the same vertical plane of which "g" is the lay-out (FIG. 6) on the horizontal plane and that the angle x between the generatrix "g" and the straight line "p" perpendicular to the seam-line, in the plane h—h (FIG. 6), has the same value for the two axially adjacent rollers.

Figure 6:
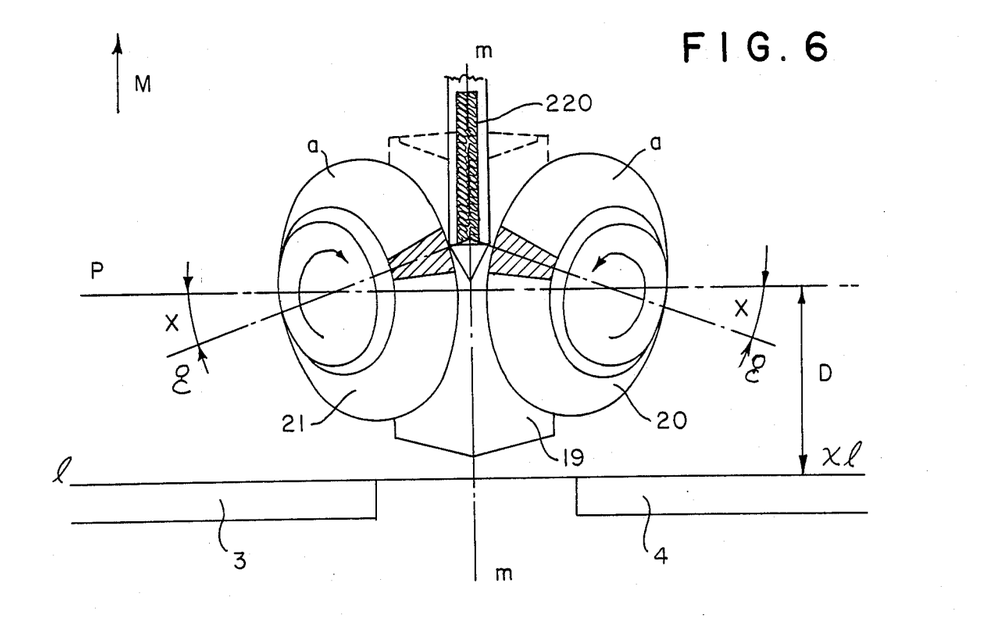
FIG. 6—illustrates a plan view of the device of the invention, during the phase of joining the lengths.

While by now combining, together the FIGS. 4 and 5 with the FIGS. 1, 2 and 6, it can easily be noted that the pairs of rollers become shifted, due to the effect of the movement of the repeater, exclusively along the seam-line, which is the intersection of the horizontal plane h—h with the meridian plane m—m; whereas, the two axially adjacent rollers always remain situated on opposite sides, with respect to said meridian plane.

Figure 7:
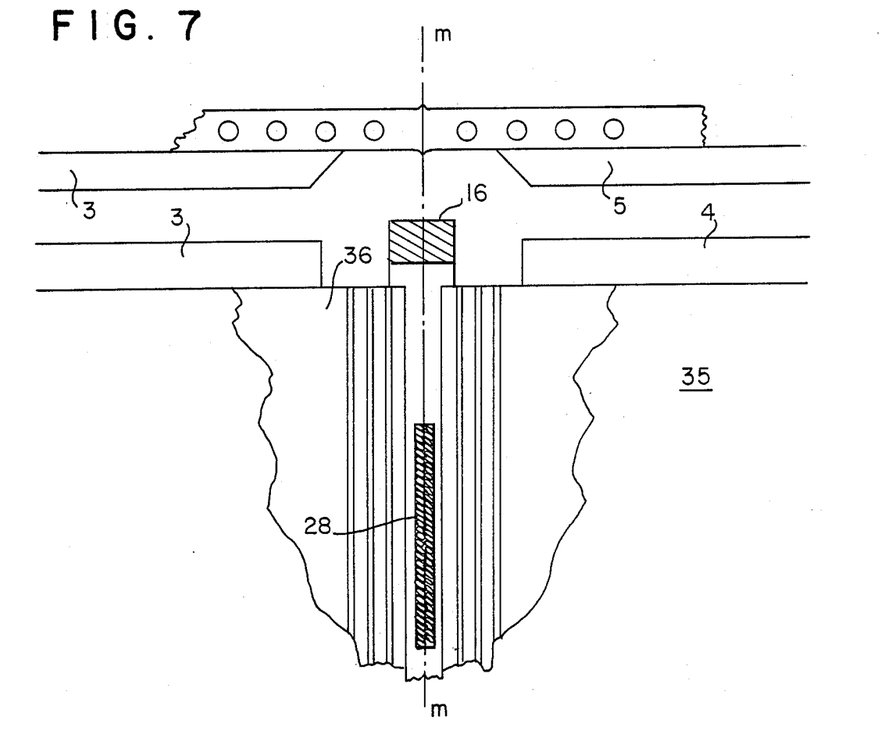
FIG. 7—illustrates a straight section of a strip portion, around the junction zone.

Now that the structural characteristics of the device have been taken note of, it will be possible to understand how the device functions through making reference, in particular, to FIGS. 6 and 7. However, when describing the process, no mention will be made of the alternative variations that can be carried out when using the diverse forms of embodiment illustrated above, of the device of the invention, because these variations are quite obvious and can immediately be deduced by anyone skilled in the art.

The joining takes place when a new rubberized fabric length 36, arrives at the supporting table 3 for being jointed onto the tail-end 35 of the strip formed by the series of previously-joined lengths, the tail-end being disposed on the supporting table 4.

The figures illustrate precisely this particular moment when the tailend of the strip and the fabric length, just arrive on table 3, are disposed side-by-side, strictly parallel to one another, with the exiting-edge U, of the strip 35 and the entering-edge E, of the length 36, at an exactly prefixed distance. The ways have already been explained here for obtaining the perfect alignment as well as the pre-fixed reciprocal distancing between the elements to be joined. Of course, it is also possible, according to a variation in the process and by applying the opportune modifications to the device, to pre-dispose the exiting-edge U and the entering-edge E in such a manner as to be reciprocally contacting.

At this point, through the action of the cylinder 24, the upper rolling-group (that was raised at the termination of the previous joining operation) is, first and foremost, lowered, and taken (FIG. 2) from the atrest position (see broken-line) to the working position (see full-line), in such a way as to press the edges of the strip 35 and of the length 36, between the two pairs of opposed rollers, respectively 21-26 and 20-27 and precisely in correspondence of the upper portions "a" (see broken-line in FIG. 6) placed astride the generatrices "g".

Thereupon, the carriage motor is actuated which, through the coupling of the lead-nut and endless-screw, drags the repeater along the seam-line.

The movement of the carriage puts the rollers, which are idly mounted on their axis, into action, owing to the friction between roller and fabric, and this rotation has to be necessarily synchronous for the rollers mounted on the same prism since the rollers are connected to each other, during this rotation, by the toothed crown with which they are each provided.

Due to the particular orientation of the supporting prisms and consequently, of the particular inclination of the axis of rotation of the above-said rollers (as described above), the conical surface "a" of each roller exercises a thrust with a horizontal component force, directed perpendicularly to the seam-line, on the corresponding fabric surface. The thrust draws together the respective entering and exiting edges of the two lengths, with simultaneously pressing them one against the other, with thus obtaining the reciprocal welding due to the sticky effect of the raw elastomeric material.

It can be seen (FIG. 6) that the fabric portion which is pressed between the vertically counter-opposed rollers and against the adjacent fabric, is always just the narrow transversal portion (with respect to the longitudinal direction of the strip under formation), disposed astride the generatrix g tangent to the fabric and that the narrow portion, subsequent to the movement of the repeater, shifts progressively in the transversal direction i.e. along the seam-line, for the entire length of the edge. The simultaneous shifting, of the two portions of counter-opposed fabric, is guaranteed by the synchronism, during the rotation of the adjacent rollers.

Hence, the joining between the two fabrics, does not take place simultaneously along the entire extension of the edge but, at successive points and progressively from one end to the other of the pair of adjacent lengths.

The need for having the above-described blade 220 can now be understood.

In fact it can be seen that the rollers cause the shifting of a narrow portion of fabric in each edge towards the seam-line, until placing the two portions in reciprocal contact and/or pressing, one against the other, the two fabric portions gripped between each pair of vertically opposed rollers.

Owing to the rigidity in the edges of the rubberized fabric lengths, the reciprocal drawing together of the edges is diffused upstream of the joining point so that in the absence of a spacer-element for keeping the edges apart, such as precisely the blade, the pairs of opposed rollers would grab hold of fabric portions, progressively pre-disposed even nearer to each other, so that these would-results as being in reciprocal contact, even prior to the pressing action by the rollers has been initiated.

In such a case, there would result an extremely disuniform and irregular joint having an accumulation of fabric in the final zone of the joint, with involving all the consequent negative results.

Clearly, the above-described blade assures a correct and constant distancing of the edges to be joined, along the entire development of the joint.

Clearly, the above-described blade assures a correct and constant distancing of the edges to be joined, along the entire developoment of the joint.

The utility can now also be understood, of the wings 171 and 221 which, in collaboration with each other, realize a containing and guiding device for the fabric edges, with also sending the edges to the jointing point under perfect reciprocal and coplanar conditions.

It has already been stated that a convenient form of embodiment for the device of the invention foresees the use of two repeaters (not shown) having a reciprocal movement in the opposite sense.

The two repeaters, with their relative rolling-groups, are entirely identical to each other, so much so that the previous description applies to both of them. They are mounted on their respective carriages, in a position with the rolling-groups facing, and they move along the same seam-line.

As far as concerns, the functioning of the device it is now appropriate to refer to FIG. 6, whereas in said figure, the lower edge of the fabric in reality represents the mid-plane line 1—1, in the longiudinal direction of the lengths to be joined.

At the start of the jointing operation, the rolling-group that is shown, and precisely the surface portion of the rollers in contact with the fabric lengths, are found in correspondence of the above-said line 1—1.

Obviously as a result of mechanical interference, the second repeater (not shown) will have its rolling-groups disposed at a certain distance from the above-said line 1—1. Moreover, it will present the upper rolling group as still raised with respect to the two lengths.

The jointing operation commences at this point. The two repeaters move together in the same direction (indicated with the arrow M in FIG. 6), while the rolling groups of the first repeater, carry out the jointing. When the first repeater has reached the position shown in FIG. 6, after realizing a small joining tract D, the second repeater will already have surpassed, with its rolling-groups, the line 1—1, so much so that these latter will be found in correspondence of a portion of already joined fabric. At this point even the upper rolling-group of the second repeater, is lowered onto the fabric.

Starting from this point while the first repeater continues its movement in the same direction M, with realizing the welding of the lengths, from the line 1—1 till one extremity of the lengths, the second repeater inverts the direction of movement and, after recrossing over the already welded tract D, it carries out the jointing of the two lengths, till the opposite extremity.

After realizing the jointing of the lengths, along the entire length of the facing edges, the upper rolling-groups of the two repeaters, through the actioning, in the inverted sense, by the controlling device (of cylinder 24 in the illustrated example) are raised from the fabric, whilst an opportune strip winding device (not shown) recuperates the strip portion corresponding to the length of the just-joined length, till bringing the exiting-edge U of the above-said length in correspondence of the seam-line, for being welded to the new length arriving on table 3. Simultaneous to the movement of the strip, or when the latter has stopped moving, in accordance with the diverse versions of the above-described device, the two repeaters are taken to the centre of the supporting plane, ready for effecting the new joint.

The pairs of opposed rollers of the rolling-group grasp the edge to be joined, on both sides of the surface, and press it directly against the edge opposite, with a predetermined and constant force, without giving rise to any accumulation, or thinning out, of the reinforcing cords in the junction zone and without effecting any shifting of the elastomeric material.

Any eventual surplus elastomeric material that could be caused owing to the entering and exiting edges of the lengths being imperfectly prepared, finds the space for spreading in correspondence of the seam-line, with thus giving rise to a small ridge of elastomeric material (see FIG. 7) following and identifying the seam-line, without causing any thinning out between the cords at the extremity of the lengths, otherwise, the presence of this ridge is quite irrelevant as far as concern the successive working phases that are faced by the rubberized fabric strip.

The strip, realized in this way, has proved to possess high qualitative characteristics both, as regards the joining which has shown to be extremely reliable, as well as with regard to the uniformity in distribution of the eventual reinforcing cords. So much so that the junction zone does not result as being distinguishable any longer in the finished product, and not even when examined under X-Ray.

The apparatus results as being relatively simple, but nevertheless, a precise structure that is easy to control, and reliable as far as concerns its functioning, also having a high productive yield, during exercise.

Finally, it will result as obvious that the present description has only been given by way of non-limiting example and that, although not expressly described herein, there exist modifications and/or alternate variations which are easily accessible to anyone skilled in the art, that have to be considered as being comprised within the scope of the present invention.

What is claimed is:

1. A method for joining two lengths of rubberized fabric along two opposite edges for the purpose of obtaining a continuous strip of rubberized fabric, comprising the steps of positioning the outgoing edge (U) of a first length of rubberized fabric, parallel and at a predetermrined distance from a seam-line, disposed in a pre-established and invariable position, in the same lying plane as said first length along which the joining occurs, positioning the incoming edge (E) of a second length of rubberized fabric coplanar to said first length, symmetrical to said outgoing edge of said first length with respect to said seam-line, and blocking each of said edges by means of pressure exercised on each edge, in a direction perpendicular to said lying plane of said corresponding lengths, pressing said edges one against the other, through a longitudinal thrust, acting in the same lying plane of the lengths, in a substantially perpendicular direction to said seam-line, said blocking and said longitudinal thrust being exercised, through each edge, on both surfaces of the corresponding lengths, upon a limited transversal portion of said rubberized fabrics, characterized by carrying out said joining by starting from an intermediate point along said edges and proceeding towards one end of said lengths for a predetermined distance to establish a first welded portion, then while continuing said joining of said edges towards said one edge of said lengths proceeding also in the opposite direction towards the other end of said lengths, passing over said first welded portion in the process.

2. A device for butt-end joining two rubberized fabric lengths (35, 36), along their two facing edges (U, E), for the purpose of obtaining a continuous strip of rubberized fabric, said device comprising two facing, coplanar and distinct support tables, (3, 4), respectively for a first and for a second length of rubberized fabric, the intersection of a separating vertical-meridian plane (m—m), between said two tables, with a horizontal lying plane (h—h) of the tables, determining a seam-line disposed in a pre-established and invariable position along which the joining takes place, means for gripping the edges of the lengths, symmetrically situated on opposite sides of said seam line, for the blocking of the edge of each said length in said reciprocal position by means of pressure acting perpendicularly to the lying plane of said lengths and through forcing each said edge against a respective facing said edge, through a thrust acting in the same lying plane, so as to realize the welding between said respective lengths, said gripping means comprising at least one repeater that is mobile alternately in both directions, along said seam-line, parallel to the lying plane of said lengths, said at least one repeater being provided with a first rolling group (25) fixed to one extremity of said at least one repeater, said first rolling group comprising a pair of frusto-conical rollers (26,27) situated on opposite sides of said meridian plane, having their axes of rotation lying on a same plane, and inclined with respect to the tern of planes formed by said meridian plane (m—m), said lying plane (h—h) for the tables and by a third plane, perpendicular to the above-mentioned two planes, said axes being symmetrically inclined with respect to said meridian plane, each roller having a lateral surface substantially tangent to said lying plane of said tables, said at least one repeater being provided with two support arms (17, 18), situated one below and the other above said support tables, a second rolling-group (19) fixed to one extremity of said lower arm, in correspondence with said first rolling-group fixed to one extremity of said upper arm, and actioning means for shifting at least one of said rolling-groups, in both directions, perpendicular to said support tables, said second rolling group comprising a pair of frusto-conical rollers equal to and symmetrically disposed with respect to said pair of rollers of said first rolling group, said rollers corresponding to said first and second rolling-groups and lying on the same side of said meridian plane being tangent to said lying plane along the same line (g) of tangency, each lateral surface of said rollers, tangent to said lying plane of said tables being substantially smooth without undulations, waves, ripples or indentations.

3. The device according to claim 2, wherein the plane containing the axes of rotation of said pair of frusto-conical rollers is inclined with respect to a plane simultaneously perpendicular to said meridian plane and to said horizontal lying plane of the said tables, according to an angle not exceeding 25°.

4. The device according to claim 2, wherein the rollers of the same rolling-group are synchronous with each other during their rotation.

5. The device according to claim 2, wherein each of said rollers is formed by the assembly of two coaxial frusto-conical bodies, connected to one another in correspondence of their greater bases, each lateral surface of each roller comprising axially interior and axially exterior frusto-conical counter-opposed surfaces joined along a circumferential corner.

6. The device according to claim 5, wherein said axially interior frusto-conical surface of each roller is provided with a plurality of teeth that mesh with a corresponding toothed crown of an adjacent roller which is mounted in the respective rolling group.

7. The device according to claim 6, wherein said teeth do not interfere with the axially exterior frusto-conical surface of said adjacent roller.

8. The device according to claim 7, werein axially exterior frusto-conical surfaces of rollers in the same rolling-group are spaced apart from one another by a value that is less than the height of said teeth.

9. The device according to claim 2, wherein said actioning means for shifting at least one of said rolling-groups, moves both rolling-groups vertically in both directions, and symmetrically with respect to said horizontal lying plane of said support tables.

10. The device according to claim 2, further comprising two repeaters actionable independently one from the other and shiftable, one with respect to the other, mounted on said device with respect rolling-groups facing each other.

* * * * *